United States Patent [19]

Araki

[11] Patent Number: 5,121,673

[45] Date of Patent: Jun. 16, 1992

[54] APPARATUS FOR PREVENTING PERCUSSION BEATS IN BRAKE BOOSTER

[75] Inventor: Shigeru Araki, Saitama, Japan

[73] Assignee: Jidosha Kiki Co., Ltd., Tokyo, Japan

[21] Appl. No.: 567,911

[22] Filed: Aug. 15, 1990

[30] Foreign Application Priority Data

Aug. 31, 1989 [JP] Japan ............................ 1-102618[U]

[51] Int. Cl.⁵ ............................................ F15B 9/10
[52] U.S. Cl. ................................ 91/369.1; 91/369.2; 91/369.3; 91/376 R; 92/84
[58] Field of Search ................. 91/369.1, 369.2, 369.3, 91/376 R; 92/82; 403/154, 155, 325

[56] References Cited

U.S. PATENT DOCUMENTS

| | | | |
|---|---|---|---|
| 3,727,516 | 4/1973 | Myers et al. | 91/369.3 X |
| 4,469,009 | 9/1984 | Takayama et al. | 91/376 R |
| 4,472,997 | 9/1984 | Ohmi | 91/369.3 X |
| 4,494,445 | 1/1985 | Furuta et al. | 91/369.3 |
| 4,787,292 | 11/1988 | Tsuyuki et al. | 91/369.3 |
| 4,846,047 | 7/1989 | Uyama et al. | 91/369.4 |
| 4,907,494 | 3/1990 | Gautier et al. | 91/376 R |
| 4,951,550 | 8/1990 | Ohki et al. | 91/369.3 |

FOREIGN PATENT DOCUMENTS

| | | | |
|---|---|---|---|
| 0124455 | 7/1984 | Japan | 91/369.2 |
| 2065809 | 7/1981 | United Kingdom | 91/369.3 |

Primary Examiner—John T. Kwon
Assistant Examiner—Todd Mattingly
Attorney, Agent, or Firm—Flynn, Thiel, Boutell & Tanis

[57] ABSTRACT

Apparatus for preventing percussion beats in a brake booster is disclosed. The apparatus prevents percussion beats from occurring as a result of an abutment of a valve plunger, which forms part of a valve mechanism, against a key member which is used to prevent the valve plunger from being withdrawn from the valve body. An elastic member is formed on at least one of the key member and the valve plunger. The key member and the valve plunger are formed with abutting surfaces thereon which are adapted to abut against each other. A normal spacing between the abutting surfaces is chosen to be greater than a spacing as measured between the elastic member and the other member which is abutted by the elastic member. In this manner, the occurrence of percussion beats as the key member abuts against the valve plunger is prevented while also preventing a reduction in the durability of the elastic member.

2 Claims, 2 Drawing Sheets

APPARATUS FOR PREVENTING PERCUSSION BEATS IN BRAKE BOOSTER

FIELD OF THE INVENTION

The invention relates to an apparatus for preventing percussion beats in a brake booster, and more particularly, to such apparatus which is effective to prevent percussion beats from occurring as a result of abutment of a valve plunger, which forms part of a valve mechanism, against a key member which is used to prevent the valve plunger from being withdrawn from a valve body when an input shaft is operated in response to a depression.

DESCRIPTION OF THE PRIOR ART

An apparatus for preventing percussion beats in brake booster is known (see U.S. Pat. No. 3,727,516) comprising a valve plunger slidably fitted into a valve body and mechanically coupled to an input shaft, an annular groove formed in the outer peripheral surface of the plunger, a key member inserted into the valve body radially of the valve plunger and having a fork at its free end which is engaged with the annular groove, and an elastic member on at least either one of the key member and the valve plunger and disposed for abutment against the other of these members to prevent a direct abutment of one of these members against the other when the valve plunger is driven forward.

However, in the prior art practice, the elastic member is disposed on only one of the key member and the valve plunger, so that when a brake pedal is depressed with an increased force, the valve plunger and the key member will be urged strongly against each other to cause an excessive compression of the elastic member, disadvantageously causing a reduction in its durability.

SUMMARY OF THE INVENTION

In view of the foregoing, the invention relates to a brake booster including an elastic member as mentioned above in which the key member and the valve plunger are provided with surfaces which are adapted to abut against each other with a normal spacing therebetween which is greater than a spacing measured between the elastic member and the other member which is abutted by the elastic member.

With this arrangement, when the input shaft and the valve plunger are driven forward, the elastic member initially abuts against the other member because of its reduced spacing, thereby preventing the occurrence of percussion beats which may be produced as a result of a direct engagement between the key member and the valve plunger.

When the input shaft and the valve plunger are driven forward with a greater force, the elastic member is subject to an elastic deformation to permit a direct abutment of one of the key member and the valve plunger against the other, thus preventing the elastic member from being excessively compressed and thus preventing a resulting reduction in its durability.

Since the direct abutment between the key member and the valve plunger occurs while causing a compression and deformation of the elastic member, percussion beats which may result from such abutment can be prevented from occurring.

Accordingly, the described arrangement is effective to prevent the occurrence of percussion noise and to prevent a reduction in the durability of the elastic member.

Above and other objects, features and advantages of the invention will become apparent from the following description of an embodiment thereof with reference to the attached drawings.

DETAILED DESCRIPTION OF EMBODIMENT

Figure 1:
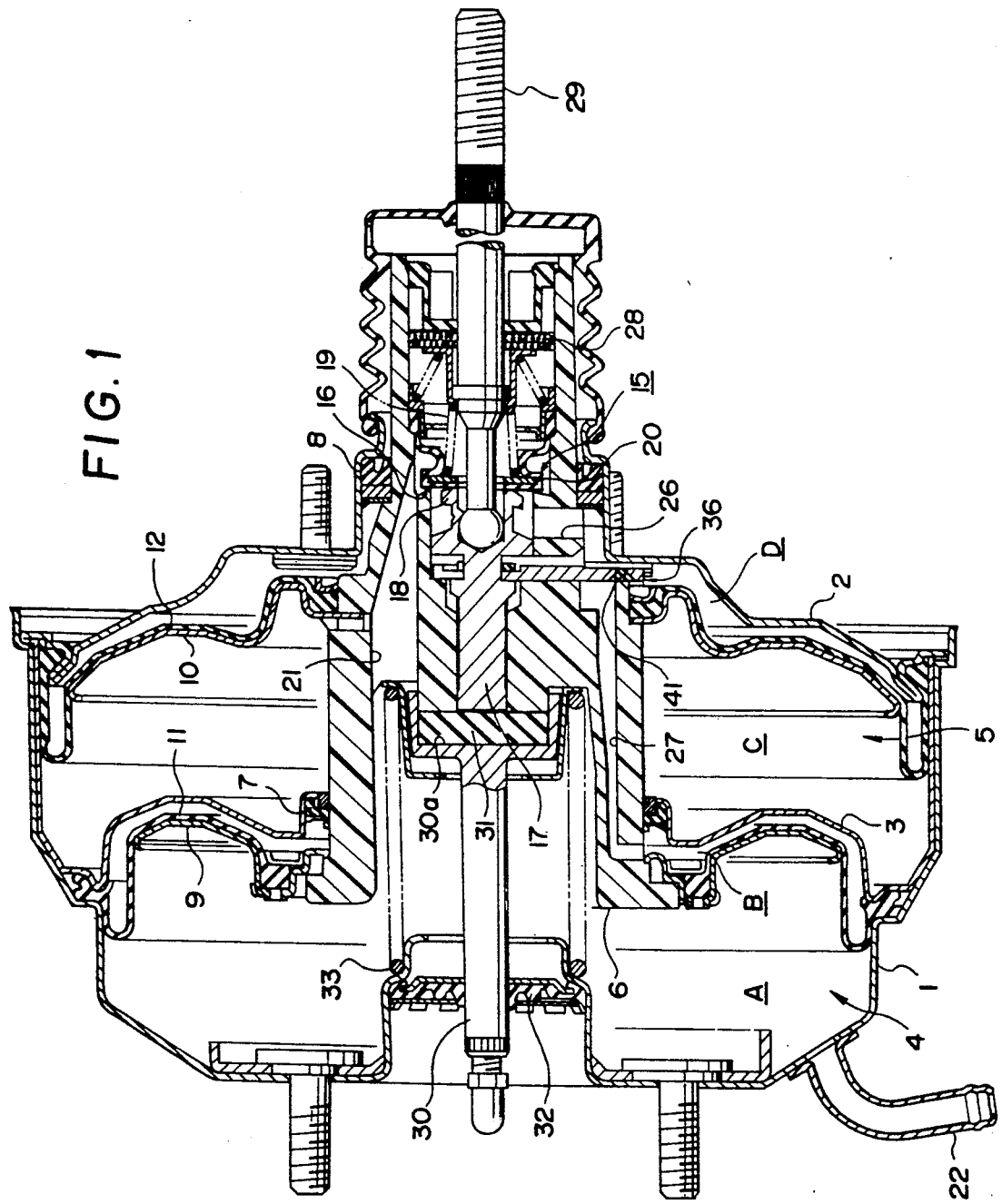
FIG. 1 is a longitudinal section, partly in side elevation, of one embodiment of the invention.

The invention will now be described specifically with reference to an embodiment shown in the drawings. In FIG. 1, a front shell 1 and a rear shell 2 define an enclosed vessel, the interior of which is divided by a centrally disposed center plate 3 into a front chamber 4 and a rear chamber 5, which are disposed forwardly and rearwardly of the center plate. A substantially cylindrical valve body 6 extends through axial portions of the rear shell 2 and the center plate 3 in a slidable manner while maintaining a hermetic seal therebetween by means of annular seal members 7, 8.

Connected to the valve body 6 are a front power piston 9 and a rear power piston 10, respectively, which are disposed within the front chamber 4 and the rear chamber 5, respectively, and a front diaphragm 11 and a rear diaphragm 12 are applied to the back surfaces of the respective power pistons 9 and 10, respectively. In this manner, a constant pressure chamber A and a variable pressure chamber B are defined across the front diaphragm 11, and a constant pressure chamber C and a variable pressure chamber D are defined across the rear diaphragm 12.

The valve body 6 contains a valve mechanism 15 which switches a fluid circuit between the pair of constant pressure chambers A, C and the pair of variable pressure chambers B, D. Specifically, the valve mechanism 15 comprises an annular, first valve seat 16 formed on the valve body 6, an annular, second valve seat 18 formed on the right-end of a valve plunger 17 which is slidably disposed within the valve body 6 at a location radially inward of the first valve seat 16, and a valve element 20 which is urged by a spring 19 to be seated upon either valve seat 16 or 18 from the right side.

A space located radially outward of an annular seat defined by the contact between the valve element 20 and the first valve seat 16 communicates with the constant pressure chambers A and C through a constant pressure passage 21 which is formed in the valve body 6, and the constant pressure chamber A communicates with an intake manifold, not shown, through a tubing 22 mounted on the front shell 1 which introduces a negative pressure.

A space located radially inward of the annular seat defined by the contact between the valve element 20 and the first valve seat 16 and radially outward of another annular seat defined by the contact between the valve element 20 and the second valve seat 18, or a space located intermediate the both annular seats, communicates with the variable pressure chamber D through a radially extending variable pressure passage 26 which is formed in the valve body 6, and thence with the variable pressure chamber B through another variable pressure passage 27 also formed in the valve body 6.

Finally, a space located radially inward of the inner, annular seat defined by the contact between the valve element 20 and the second valve seat 18 communicates with the atmosphere through a filter 28.

The valve plunger 17 which is slidably disposed within the valve body 6 has its right end connected to an input shaft 29 which is mechanically coupled to a brake pedal, not shown, while its left end is disposed in opposing relationship with the right end face of a reaction disc 31 which is received in a recess 30a formed in one end of a push rod 30. The left end of the push rod 30 slidably extends through an axial portion of the front shell 1 to the exterior thereof, with a seal member 32 interposed therebetween for connection with a piston of a master cylinder, not shown. The valve body 6 is normally maintained in its inoperative position shown by a return spring 33.

Figure 3:
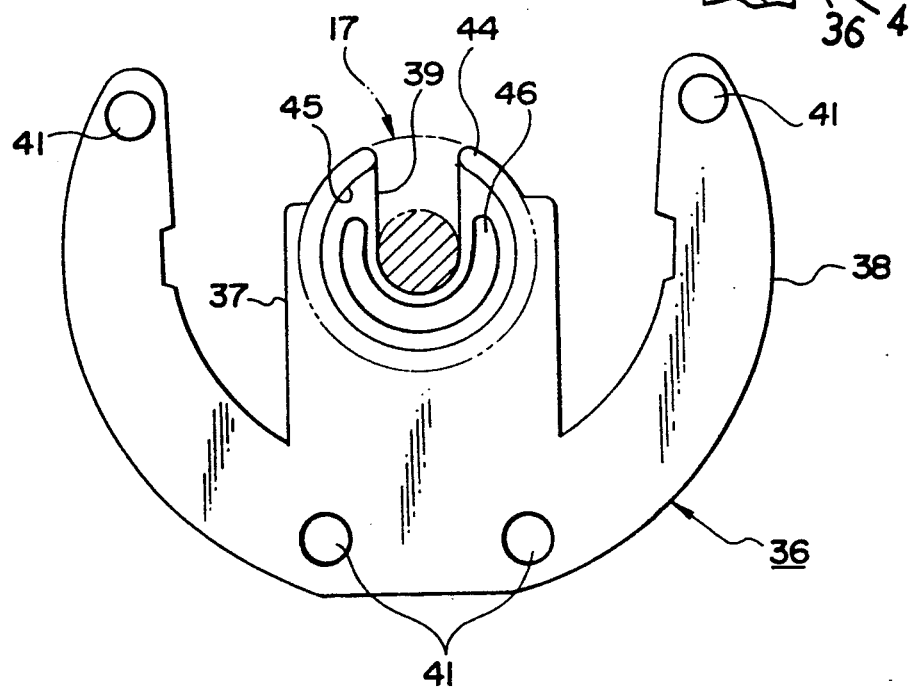
FIG. 3 is a right-hand side elevation of a key member 36.

A key member 36 acts to prevent the valve plunger 17 from being withdrawn from the valve body 6. Referring to FIG. 3, the key member 36 comprises an inserted portion 37 which is inserted into the valve body 6 in the radial direction of the valve plunger 17, and a semi-circular arc 38 which surrounds the outer periphery of the valve body 6, and a fork 39 formed at the free end of the inserted portion 37.

Returning to FIG. 1, the inserted portion 37 is inserted into the valve body 6 radially of the valve plunger 17, with its fork 39 located at the free end thereof engaged with an annular groove 30 formed in the outer peripheral surface of the valve plunger 17, thus preventing the valve plunger 17 from being withdrawn from the valve body 6.

The key member 36 is axially movable through a given amount with respect to each of the valve body 6 and the valve plunger 17. In the inoperative condition of the brake booster, elastic members 41 mounted on the arc 38 of the key member 36 abut against the internal wall surface of the rear shell 2. Under this condition, the key member 36 maintains the valve plunger 17 at an advanced position relative to the valve body 6, whereby the valve element 20 is located close to or in abutment against the first valve seat 16. If a brake pedal is now depressed to operate the input shaft 29 and the valve plunger 17, a switching action of a fluid circuit by the valve mechanism 15 is immediately operative.

Figure 2:
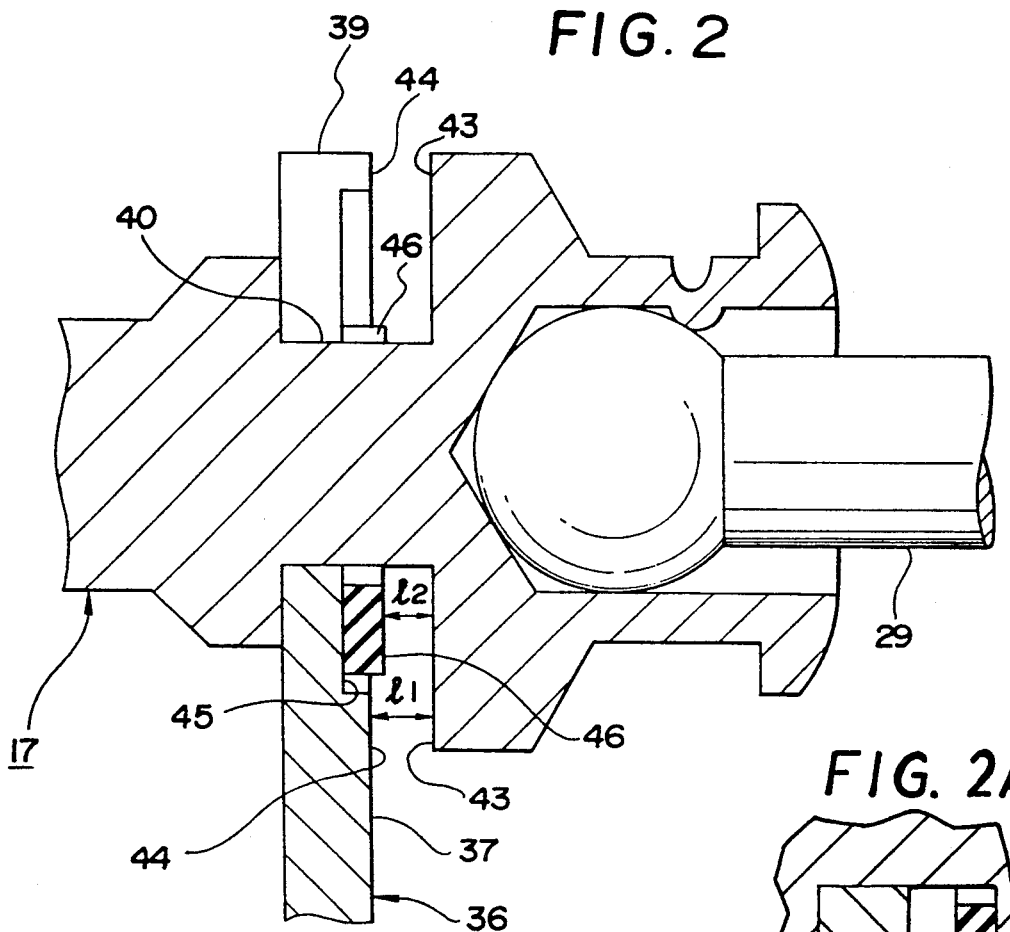
FIG. 2 is an enlarged section of part shown in FIG. 1.

Referring to FIGS. 2 and 3, it will be noted that the valve plunger 17 and the key member 36 are formed with abutting surfaces 43, 44, respectively, which abut against each other as the valve plunger 17 is driven forward. In the present embodiment, the abutting surface 44 on the key member 36 is formed with a recess 45 in which an elastic member 46 is received and connected to the key member 36. The elastic member 46 projects rearwardly beyond the abutting surface 44 of the key member 36 so that the spacing $l_1$ between the abutting surfaces 43, 44 is greater than a spacing $l_2$ measured between the elastic member 46 and the abutting surface 43 on the valve plunger 17. Accordingly, the elastic member 46 abuts against the abutting surface 43 before the abutment between the surfaces 43, 44 occurs.

In the described arrangement, when a brake pedal, not shown, is depressed to drive the input shaft 19 and the valve plunger 17 to the left, the valve element 20 becomes seated upon the first valve seat 16 formed on the valve body 6, whereby the communication between the variable pressure chambers B, D and the constant pressure chambers A, C is interrupted while the valve element 20 moves away from the second valve seat 18 formed on the valve plunger 17, causing the variable pressure chambers B, D to communicate with the atmosphere. Hence, the atmosphere is introduced into variable pressure chambers B, D, whereupon a pressure differential across the respective power pistons 9, 10 are effective to drive the power pistons 9, 10 and the valve body 6 forward against the resilience of the return spring 13 to provide a braking action, in the similar manner as in a conventional brake booster of tandem type.

If the brake pedal is depressed rapidly or if the brake pedal is depressed under the fully loaded condition of the brake booster, the abutting surface 43 on the valve plunger 17 tends to abut against the abutting surface 44 on the key member 36, but before this occurs, the abutting surface 43 abuts against the elastic member 46, thus preventing percussion beats from being produced.

In particular, when the brake pedal is depressed under the fully loaded condition of the brake booster, the elastic member 46 tends to be compressed excessively. However, when the elastic member 46 is compressed to a given degree, the surfaces 43, 44 on the valve plunger 17 and the key member 36 abut against each other, thus preventing an excessive compression of the elastic member 46 and a resulting reduction in its durability. Since the abutment between the surfaces 43, 44 occurs while accompanying a compression and deformation of the elastic member 46, the occurrence of percussion beats can again be suppressed.

When the brake pedal is released under the braked condition, the second valve seat 18 on the valve plunger 17 engages the valve element 20 to interrupt the communication of the variable pressure chambers B, D with the atmosphere while the valve element 20 moves away from the first valve seat 16 to cause the variable pressure chambers B, D to communicate with the constant pressure chambers A, C, whereby the power pistons 9, 10 are returned to the inoperative positions by the action of the return spring 33.

When the key member 36 abuts against the internal surface of the rear shell 2 as the power pistons 9, 10 retract, the valve plunger 17 which is interlocked therewith ceases to retract, but the power pistons 9, 10 and the valve body 6 continue their retracting movement. When the retracting movement of the valve body 6 brings the first valve seat 16 on the valve body 6 close to the valve element 20 until the clearance therebetween is substantially equal to zero, the valve body 6 abuts against the key member 36 to stop its motion. Accordingly, the valve mechanism 15 is effective to switch a fluid circuit immediately when the input shaft 29 is driven forward for the next time.

Figure 2A:
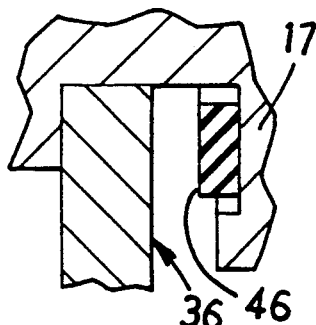
FIG. 2A shows an alternative to the FIG. 2 arrangement.

In the described embodiment, the elastic member 46 is mounted on the key member 36, but the elastic member may also be mounted on the valve plunger 17 (see FIG. 2A). Alternatively, such member may be mounted on both.

While the invention has been shown and described above in connection with a preferred embodiment thereof, it should be understood that a number of changes, modifications and substitutions therein will readily occur to one skilled in the art from the above disclosure without departing from the spirit and scope of the invention defined by the appended claims.

What is claimed is:

1. A brake booster comprising an input shaft, a valve body, a valve plunger slidably fitted in said valve body and mechanically coupled to said input shaft, said valve plunger having an annular groove in the outer peripheral surface thereof, a key member inserted into said valve body and extending radially from said valve plunger, said key member having a fork at its radially inner end which fork is received in said annular groove so that said valve plunger is movable with respect to said key member to a limited extent, said fork and said groove having opposed walls adapted to be moved into abutment with each other, and an elastic member provided on said wall of one member of the group consisting of said fork and said groove, said elastic member being adapted to be brought into abutting contact with said wall of the other member of said group when said valve plunger is moved forwardly relative to said key member, said opposed wall of one member of the group consisting of said fork and said groove having a recess therein, said elastic member being disposed either in said recess or on the opposed wall of the other member of said group and projecting axially therefrom, the axial spacing between said opposed walls of said fork and said groove being greater than the axial spacing between said elastic member and the wall opposed thereto so that when said valve plunger is moved forwardly, said elastic member will contact said wall opposed thereto before said opposed walls of said fork and said groove contact each other and continued movement of said opposed walls toward each other will compress said elastic member until said opposed walls abut against each other, said recess being provided in said opposed wall of said fork, the wall opposed to said recess being the wall of said groove, said elastic member being disposed in and projecting axially from said recess, said recess being arcuate and partially surrounding said valve plunger, said elastic member being arcuate and partially surrounding said valve plunger, and said elastic member having radially inner and outer walls which are radially spaced from radially inner and outer walls of said recess so that said elastic member is free of radial confinement.

2. A brake booster comprising an input shaft, a valve body, a valve plunger slidably fitted in said valve body and mechanically coupled to said input shaft, said valve plunger having an annular groove in the outer peripheral surface thereof, a key member inserted into said valve body and extending radially from said valve plunger, said key member having a fork at its radially inner end which fork is received in said annular groove so that said valve plunger is movable with respect to said key member to a limited extent, said fork and said groove having opposed walls adapted to be moved into abutment with each other, and an elastic member provided on said wall of one member of the group consisting of said fork and said groove, said elastic member being adapted to be brought into abutting contact with said wall of the other member of said group when said valve plunger is moved forwardly relative to said key member, said opposed wall of one member of the group consisting of said fork and said groove having a recess therein, said elastic member being disposed either in said recess or on the opposed wall of the other member of said group and projecting axially therefrom, the axial spacing between said opposed walls of said fork and said groove being greater than the axial spacing between said elastic member and the wall opposed thereto so that when said valve plunger is moved forwardly, said elastic member will contact said wall opposed thereto before said opposed walls of said fork and said groove contact each other and continued movement of said opposed walls toward each other will compress said elastic member until said opposed walls abut against each other, said elastic member being disposed in and projecting axially from said recess, said recess partially surrounding said valve plunger, said elastic member partially surrounding said valve plunger, and said elastic member having radially inner and outer walls which are radially spaced from radially inner and outer walls of said recess so that said elastic member is free of radial confinement.

* * * * *